United States Patent [19]

Izawa et al.

[11] Patent Number: 5,414,331
[45] Date of Patent: May 9, 1995

[54] DRIVE CIRCUIT FOR BRUSHLESS MOTOR

[75] Inventors: Hirokazu Izawa, Aichi; Jiro Egawa, Yokosuka; Kenichi Komiya, Kawasaki, all of Japan

[73] Assignee: Kabushiki Kaisha Toshiba, Kanagawa, Japan

[21] Appl. No.: 971,953

[22] Filed: Nov. 5, 1992

[30] Foreign Application Priority Data

Nov. 6, 1991 [JP] Japan ................ 3-289629

[51] Int. Cl.⁶ .................. H02K 23/00; H02P 1/18
[52] U.S. Cl. ......................... 318/254; 318/439; 318/138
[58] Field of Search ............... 318/254, 439, 138

[56] References Cited

U.S. PATENT DOCUMENTS

| | | | |
|---|---|---|---|
| 3,839,661 | 10/1974 | Wada | 318/138 |
| 4,008,425 | 2/1977 | Dickey | 318/254 |
| 4,135,120 | 1/1979 | Hoshimi et al. | 318/254 |
| 4,258,299 | 3/1981 | Takeda et al. | 318/254 |

FOREIGN PATENT DOCUMENTS 3-36986 2/1991 Japan .................. H02P 6/02
3-76119 12/1991 Japan .................. H02P 6/02

Primary Examiner—William M. Shoop, Jr.
Assistant Examiner—Karen Masih
Attorney, Agent, or Firm—Limbach & Limbach

[57] ABSTRACT

A drive circuit for a brushless motor having a rotor formed of a permanent magnet and stator coils includes a plurality of magnetic sensors each for sensing a rotational position of the rotor of the brushless motor to generate a voltage signal in accordance with a magnitude of a magnetic flux density received from the rotor passing, power amplifiers each for converting the voltage signal from each corresponding magnetic sensor to a drive voltage having a predetermined phase and voltage value and supplying the drive voltage obtained to each corresponding stator coil, a speed control signal generating circuit for generating a speed control signal for control of the rotational speed of the brushless motor, and magnetic sensor controller for controlling the magnitude of the output voltage of each magnetic sensor in response to the speed control signal so that the output voltage of each magnetic sensor takes a value in accordance with the speed control signal.

1 Claim, 4 Drawing Sheets

DRIVE CIRCUIT FOR BRUSHLESS MOTOR

BACKGROUND OF THE INVENTION

1. Field of the invention

This invention relates to a brushless motor drive circuit applying a predetermined magnitude of drive voltages sequentially to a plurality of stator coils with a predetermined phase angle, and more particularly to such a brushless motor drive circuit arranged so that the drive voltages are obtained from magnetic sensors delivering voltage signals in response to a magnetic flux density from a rotor formed by a permanent magnet.

2. Description of the prior art

Generally, a brushless motor comprises a plurality of stator coils, a rotor formed by a permanent magnet, and a plurality of Hall elements serving as magnetic sensors each producing a rotor position signal in response to a magnetic flux density from the rotor passing. The drive voltages applied to the stator coils respectively are sequentially switched in synchronism with rotation of the rotor based on the rotor position signals from the respective Hall elements. The drive voltages applied to the respective stator coils are obtained either from a usual power supply circuit or by amplifying the output voltages from the Hall elements. In the latter case, particularly, multiplication circuits are provided across output lines of the Hall elements respectively so that the magnitude of the drive voltages are controlled for the purpose of controlling the rotational speed of the motor by means of speed control signals. Each multiplication circuit is arranged to perform an analog multiplication so that the output voltage from the corresponding Hall element takes a value in accordance with the magnitude of the speed control signal. In the prior art, however, the cost of the drive circuit incorporating the multiplication circuits are disadvatageously increased since the multiplication circuits are complicate.

SUMMARY OF THE INVENTION

Therefore, an object of the present invention is to provide a drive circuit for the brushless motor which has a simplified and cost-effective electrical circuit configuration for controlling the magnitude of the drive voltages applied to the stator coils in accordance with the speed control signals respectively.

The present invention provides a drive circuit for a brushless motor having a rotor comprising a permanent magnet and a plurality of stator coils. The drive circuit comprises a plurality of magnetic sensors each provided for sensing a rotational position of the rotor of the brushless motor to thereby generate a voltage signal in accordance with a value of a magnetic flux density received from the rotor passing. Each magnetic sensor comprises a Hall element having positive and negative input terminals to one of which terminals the current of the positive polarity is supplied, the other of the terminals being supplied with the current of the negative polarity. Power amplifying means is provided for converting the voltage signal from each magnetic sensor to a drive voltage having a predetermined phase and voltage value and supplying the drive voltage obtained to each corresponding stator coil. Speed control signal generating means is provided for generating a speed control signal for control of the rotational speed of the brushless motor. Magnetic sensor control means comprises first and second amplifiers which convert the speed control signal to currents of a positive polarity and a negative polarity respectively, which currents are supplied to the positive and negative input terminals of each Hall element respectively.

In the above-described drive circuit for the brushless motor, each magnetic sensor generates the position detection signal or the voltage signal in phase with rotation of the rotor, in response to the magnetic flux density from the rotating rotor. The voltage signal generated by each magnetic sensor is applied as the drive voltage to the corresponding stator coil after it has been amplified by the corresponding power amplifying means and adjusted to have a phase corresponding to a suitable commutation timing of each stator coil. In this operation, the magnetic sensor control means controls the output voltage of each magnetic sensor so that it takes a value in accordance with the speed control signal, thereby controlling the rotational speed of the brushless motor.

Other objects of the present invention will become obvious upon understanding of the illustrative embodiment about to be described. Various advantages not referred to herein will occur to those skilled in the art upon employment of the invention in practice.

BRIEF DESCRIPTION OF THE DRAWINGS

An embodiment of the present invention will be described with reference to the accompanying drawings in which.

DESCRIPTION OF THE PREFERRED EMBODIMENT

Figure 1:
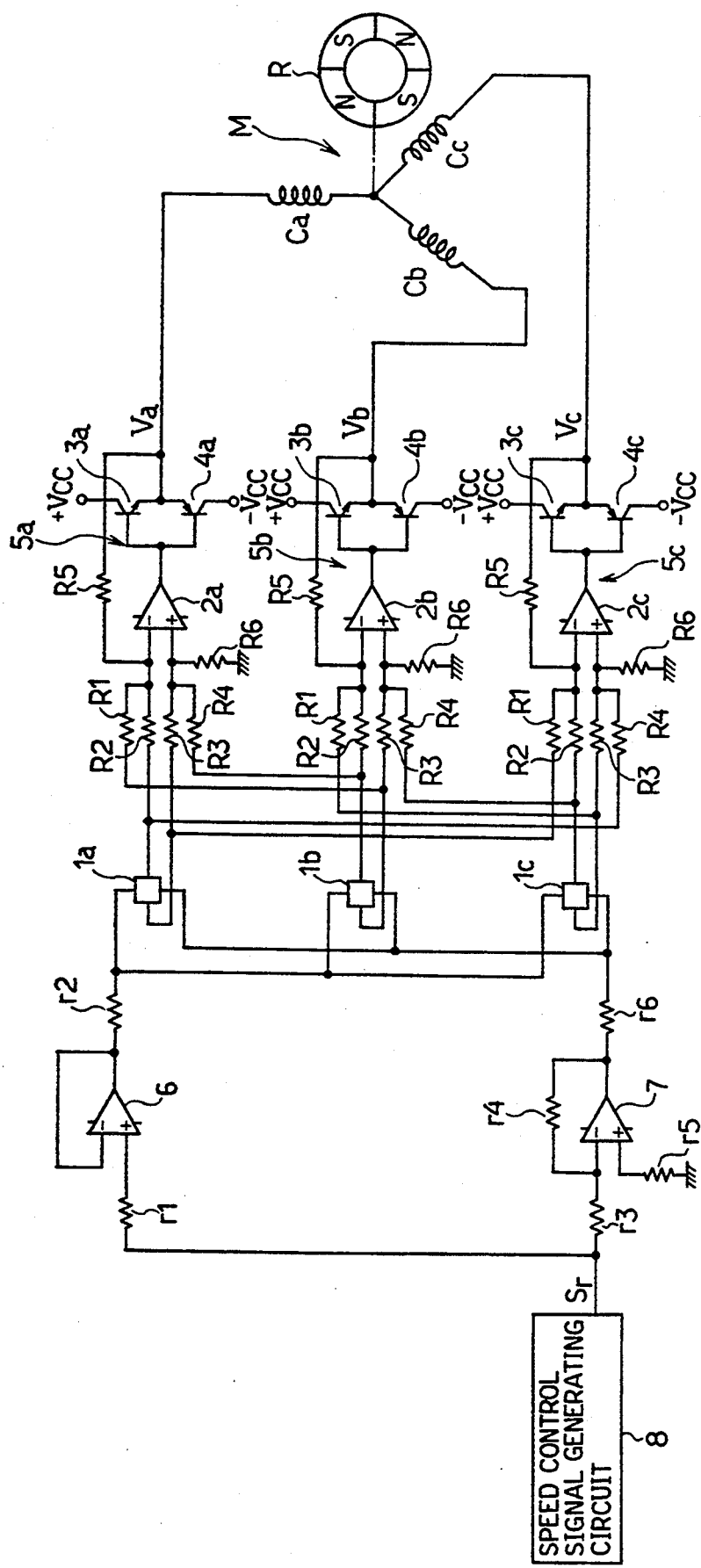
FIG. 1 is a circuit diagram showing an electrical configuration of the drive circuit of the embodiment of the present invention.

The embodiment of the present invention will now be described with reference to the drawings. A brushless motor M has a rotor R formed from a permanent magnet. Three Hall elements 1a, 1b and 1c serving as magnetic sensors are spaced by an electrical angle of 120 degrees from one another for sensing the rotational position of the rotor R. For example, a pair of output terminals of the Hall element 1a are connected to plus and minus input terminals of an amplifier 2a via resistances R2 and R3 respectively. Also, a pair of output terminals of the Hall element 1b adjacent to the Hall element 1a are connected to the plus and minus input terminals of the amplifier 2a via resistances R1 and R4 respectively. The plus input terminal of the amplifier 2a is grounded through a resistance R6 and its minus input terminal is connected via a resistance R5 to emitters of an NPN transistor 3a and a PNP transistor 4a, which transistors form a series circuit with the emitters connected in common. An output terminal of the amplifier 2a is connected to the bases of the transistors 3a, 4a, which bases are connected in common. The amplifier 2a and the transistors 3a, 4a compose power amplifying means 5a. The output voltage of the Hall element 1a is amplified and adjusted by the power amplifying means 5a so as to have a phase in which a stator coil Ca is supplied with a voltage with a suitable value at a suitable timing. The emitters of the transistors 3a, 4a connected in common are further connected to the stator coil Ca of the brushless motor M so that a drive voltage is supplied to the stator coil Ca.

In the same manner as in the above-described Hall element 1a, output terminals of the Hall elements 1b, 1c are connected via networks each comprising resistances R1–R4 and power amplifying means 5b and 5c to stator coils Cb and Cc, respectively so that drive voltages each having a suitable phase and magnitude are supplied at suitable timings to the stator coils Cb, Cc respectively. These stator coils Ca, Cb and Cc are connected into a wye configuration. The collectors of the transistors 3a–3c are connected to power supply terminals $+V_{CC}$ respectively and the collectors of the transistors 4a–4c are connected to power supply terminals $-V_{CC}$ respectively.

Magnetic sensor control means is composed of a first amplifier 6 whose gain is 1 and a second amplifier 7 whose gain is $-1$. A plus input terminal of the first amplifier 6 is connected via a resistance r1 to an output terminal of a speed control signal generating circuit 8. A minus input terminal of the first amplifier 6 is connected to its output terminal so that a speed control signal $S_r$ input to it is delivered in the condition that the signal has the same polarity as its input polarity with influences of the resistance r1 and the like eliminated. The output terminal of the amplifier 6 is connected via a resistance r2 to either input terminals of the Hall elements 1a, 1b, 1c, for example, to the plus input terminals. A minus input terminal of the second amplifier 7 which is an inverting amplifier is connected via a resistance r3 to the output terminal of the speed control signal generating circuit 8. This minus input terminal of the amplifier 7 is further connected via a resistance r4 to its output terminal. A plus input terminal of the amplifier 7 is grounded via a resistance r5. The output terminal of the amplifier 7 is connected via a resistance r6 to the minus input terminals of the Hall elements 1a–1c.

Figure 2:
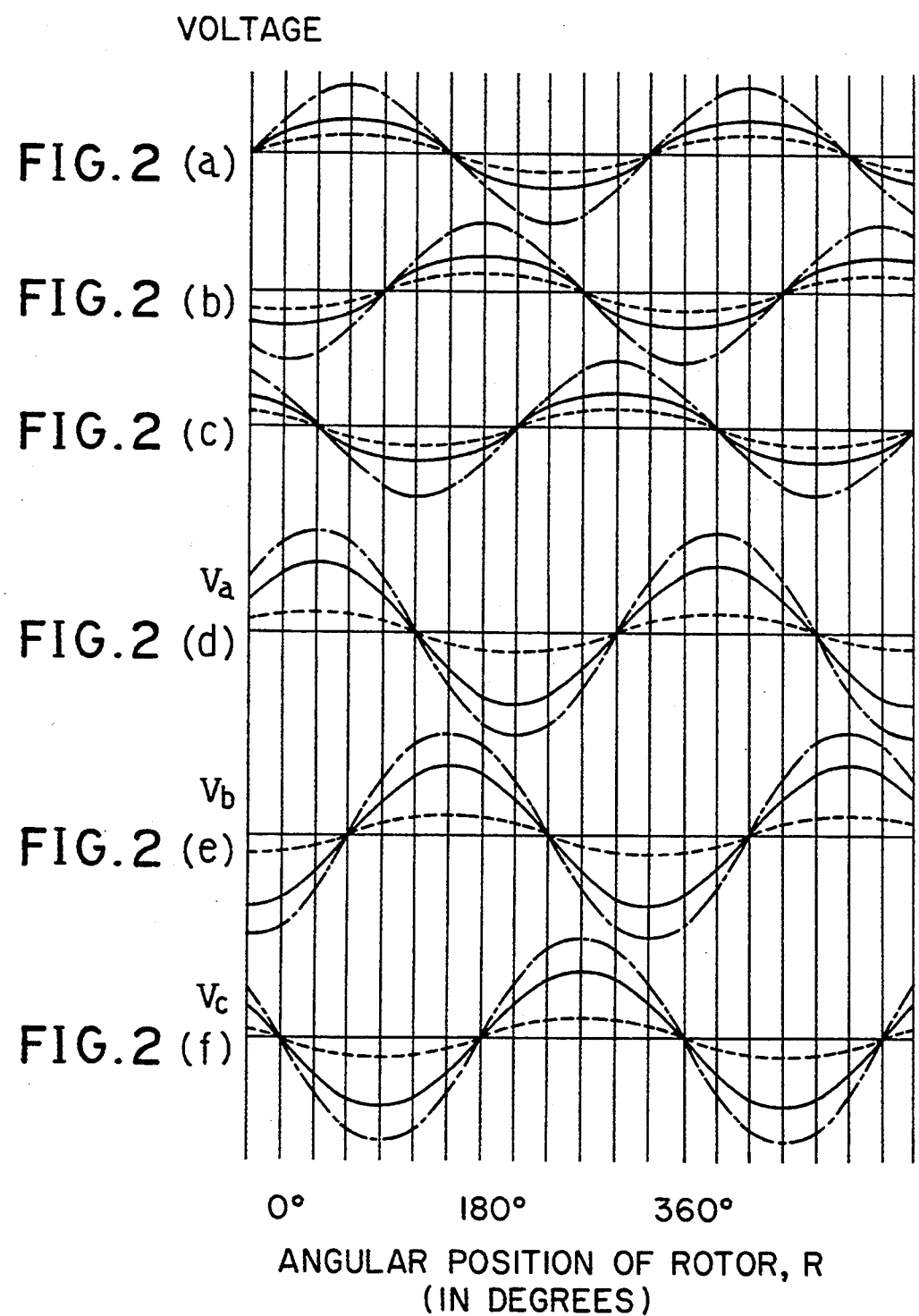
FIGS. 2(a)–2(f) are output waveform charts in the embodiment.
Figure 3:
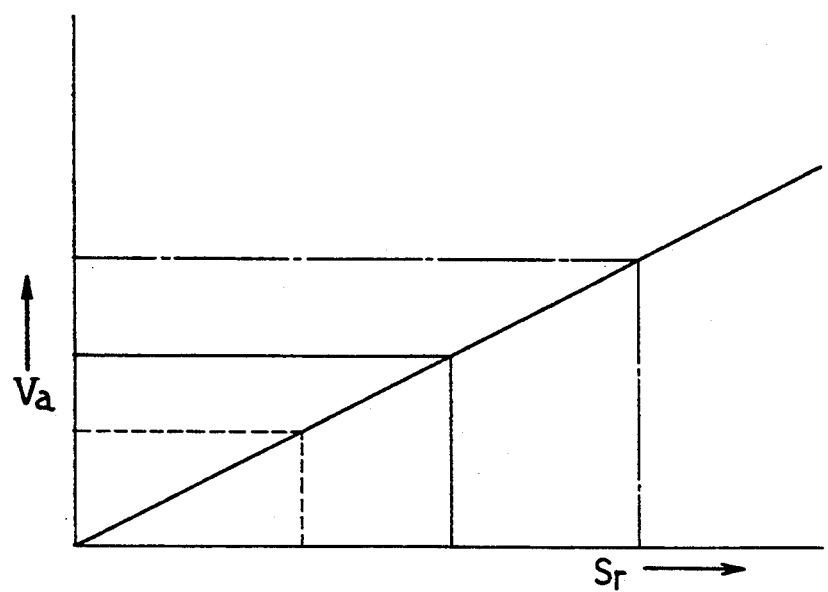
FIG. 3 is a graph showing the relationship between the speed control signal and the magnitude of the output voltage of the power amplifying means.
Figure 4A:
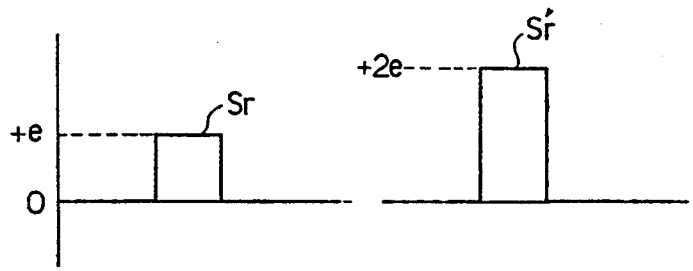
FIG. 4A–C is speed control signal pulsed as a voltage.
Figure 4B:
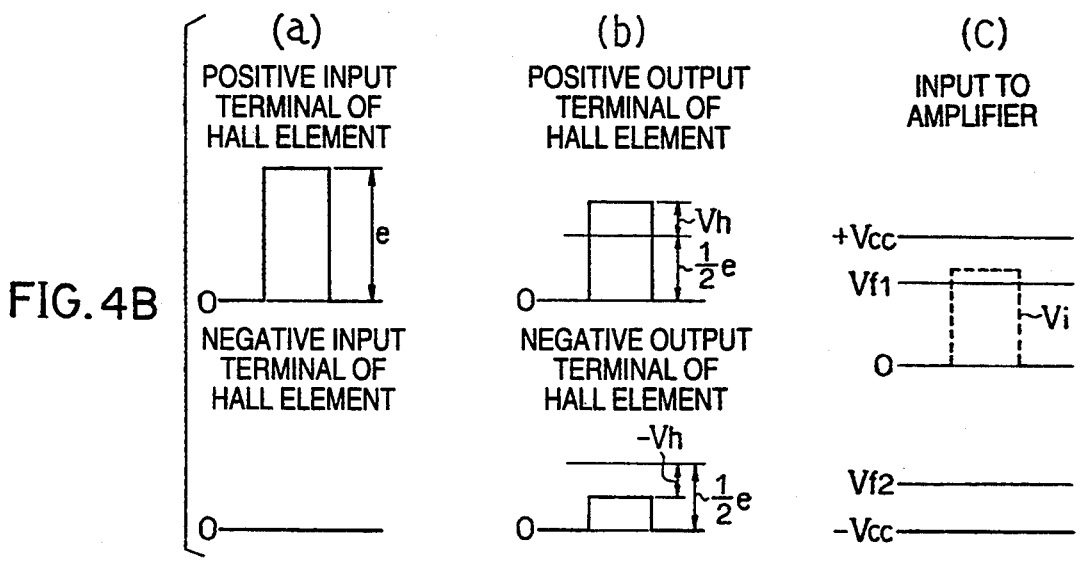
Figure 4C:
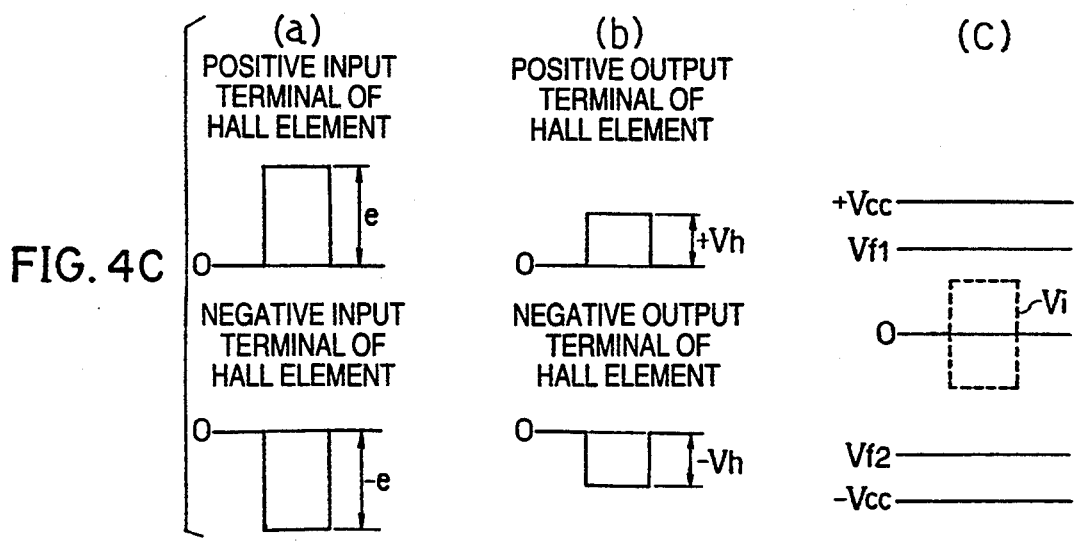

In operation, the revolution of the rotor R is detected, for example, by an encoder (not shown), which generates a detection signal. The speed control signal generating circuit 8 generates the speed control signal $S_r$ based on the detection signal from the encoder so that the rotational speed of the brushless motor M is controlled. The speed control signal $S_r$ is supplied via the amplifier 6 to either input terminals of the Hall elements 1a–1c with the signal polarity unchanged. At the side of the amplifier 7, the speed control signal $S_r$ is amplified at an amplification factor depending upon the resistances r3–r6 and the polarity of the speed control signal $S_r$ is inverted, then being supplied to the other input terminals of the Hall elements 1a–1c. As the result of the above-described circuit configuration, the Hall elements 1a–1c are supplied with DC input currents whose values are in accordance with the magnitude of the speed control signal $S_r$. An output voltage $V_h$ of each Hall element is determined as follows:

$$V_h = K \times B \times I_h$$

where K is a proportional factor determined by the characteristics of the Hall element, B is a magnetic flux density applied to the Hall element, and $I_h$ is an input current to the Hall element. Consequently, the magnitude of the output voltage of each Hall element 1a–1c takes a value in accordance with the value of the speed control signal $S_r$. FIGS. 2(a), 2(b) and 2(c) show the waveforms of the voltages delivered from the Hall elements 1a–1c respectively in response to the magnetic flux density from the rotating rotor R. In the control of the motor speed, the output voltages of the power amplifying means 5a–5c or the drive voltages $V_a$–$V_c$ can be proportionated to the speed control signal $S_r$, as shown in FIG. 3. For example, when the motor speed is to be increased in the condition that the currently produced output voltage takes the value shown by the solid line in FIG. 3, the speed control signal $S_r$ is raised so that the voltage with the magnitude shown by the dotted line can be delivered. On the other hand, when the motor speed is to be decreased, the speed control signal $S_r$ is reduced so that the voltage with the magnitude shown by the broken line can be delivered.

The output voltages of the Hall elements 1a–1c are converted to the drive voltages $V_a$–$V_c$ by the power amplifying means 5a–5c composed of the amplifiers 2a–2c and the transistors 3a–3c, 4a–4c respectively and then, are supplied to the stator coils Ca–Cc respectively. Since these three groups of circuits operate in the same manner, only the circuit for the Hall element 1a will now be described. The output voltage of the Hall element 1a is input via the resistances R2, R3 to the amplifier 2a. The output voltage with the polarity different from that of the voltage from the Hall element 1a is also supplied from the adjacent Hall element 1b via the resistances R1, R4 to the amplifier 2a. These output voltages are synthesized by the amplifier 2a and a synthesized voltage is amplified by the power amplifying means 5a including the amplifier 2a at an amplification factor depending upon the resistances R1–R6. Consequently, the output voltage $V_a$ with the waveform as shown in FIG. 2(d) is delivered to be supplied to the stator coil Ca. In the same way, the output voltage $V_b$ with the waveform as shown in FIG. 2(e) is supplied to the stator coil Cb and the output voltage $V_c$ with the waveform as shown in FIG. 2(f) is supplied to the stator coil Cc.

Although the invention has been applied to the drive circuit as described above, the drive circuit may have the arrangement that currents based on the speed control signal are supplied via the resistances and the amplifiers to the Hall elements respectively.

As described above, the present invention provides a circuit configuration wherein the input currents to the Hall elements are controlled based on the speed control signal, respectively so that the output voltages of the Hall elements take the values in accordance with the speed control signal respectively. Consequently, a stable motor speed control can be provided without use of the multiplication circuits which are required in the prior art. Thus, the simplified and cost-effective drive circuit for the brushless motor can be achieved.

The foregoing disclosure and drawings are merely illustrative of the principles of the present invention and are not to be interpreted in a limiting sense. The only limitation is to be determined from the scope of the appended claims.

We claim:

1. A drive circuit for a brushless motor having a rotor comprising a permanent magnet and a plurality of stator coils, the drive circuit comprising:

a) a plurality of magnetic sensors each provided for sensing a rotational position of the rotor of the brushless motor to generate a voltage signal in accordance with a value of a magnetic flux density received from the rotor passing, each magnetic sensor comprising a Hall element having positive and negative input terminals to one of which terminals the current of the positive polarity is supplied, the other of the terminals being supplied with the current of the negative polarity;

b) power amplifying means for converting the voltage signal from each magnetic sensor to a drive voltage having a predetermined phase and voltage value and supplying the drive voltage obtained to each corresponding stator coil;

c) speed control signal generating means for generating a speed control signal for control of a rotational speed of the brushless motor; and d) magnetic sensor control means comprising first and second amplifiers which convert the speed control signal to currents of a positive polarity and a negative polarity respectively, which currents are supplied to the positive and negative input terminals of each Hall element respectively.

* * * * *